April 6, 1926.

R. A. RASZL 1,579,888

CUTTING TOOL

Filed Dec. 26, 1924

INVENTOR.
Ricardo. A. Raszl.
BY
Gerald Baldwin
ATTORNEY.

Patented Apr. 6, 1926.

1,579,888

UNITED STATES PATENT OFFICE.

RICARDO A. RASZL, OF DETROIT, MICHIGAN.

CUTTING TOOL.

Application filed December 26, 1924. Serial No. 758,027.

*To all whom it may concern:*

Be it known that I, RICARDO A. RASZL, a citizen of Brazil, residing at Detroit, in the county of Wayne and State of Michigan, have invented a new and useful Improvement in Cutting Tools, of which the following is a specification.

My invention relates to improvements in cutting tools.

It is an object of the invention to provide a revolvable cutting tool having spirally arranged teeth, either in the form of an eccentric spiral at right angles to the axis of the tool, or in the form of a helical spiral parallel with the axis of the tool, by which cuts of any required depth and shape of cross section can be made without feeding the cutting tool during the operation. It is the intention to use this cutting tool generally on automatic machines and for quantity production, for which the manufacture of special tools for each operation is justified. The provision of teeth each one in advance of the one before permits of the tool performing a true cutting operation, and therefore has the following advantage over a milling cutter. By a milling cutter a compressing action is exerted against the surface of the work until the strain produced is sufficient to cause cleavage, this action is not only very harmful to the milling cutter, but also subjects the spindle on which it is mounted to a considerable strain.

A second object of the invention is to provide a cutting tool with spirally arranged teeth, and a gap between the last tooth of the spiral and the first tooth thereof, or in the case of tools having more than one cutting range, between the last tooth of one range and the first tooth of the range next to it, so as to provide an interval during the revolution of the tool during which time another piece of work can be substituted for the finished piece, or another portion of the same piece brought into place.

A further object of the invention is to provide a cutting tool, either in the form of a simple one piece cutter, a compound cutter, or a cutter with inserted teeth, in which the spiral gradually rises, either round most of the outer surface of the tool, or in case of tools having more than one cutting range, round the length of that range, and terminates at the high end in a gap, at the opposite end of which latter the low end of a spiral re-commences. The number of pieces of work that can be worked on at one time however depends on what supporting means for the work is provided and not on the number of cutting ranges, as it is possible, and often desirable, for the same cutting range to work on several pieces of work simultaneously.

With these and other objects in view, which will be pointed out as the description proceeds, the invention is hereinafter more fully described with the aid of the accompanying drawings.

Figure 1:
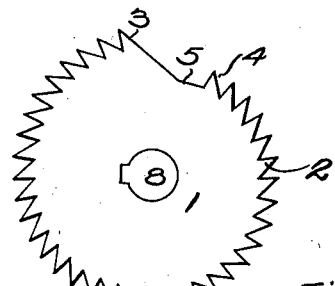
Figure 1 illustrates a front elevation of a cutting tool having eccentric spiral teeth.
Figure 2:
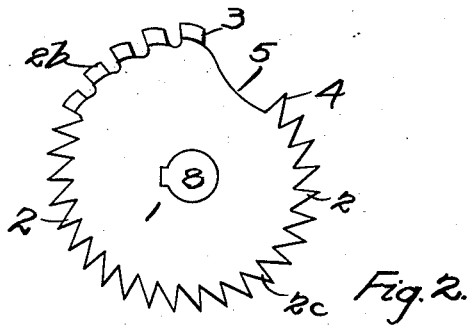
Figure 2 is a similar view showing a cutting tool wherein some of the teeth are of special cross section and the others straight teeth.

Referring to Figures 1 and 2, 1 indicates an eccentric disc having teeth 2 arranged round its perimeter in the form of an eccentric spiral. Between the high tooth 3 and the low tooth 4 is a gap 5. 8 designates the bore of the disc which is adapted to be rotatably mounted on a shaft.

The teeth shown in Figure 1 are uniform throughout and are intended on each revolution to cut a slot having a depth equal to the eccentricity between the low tooth 4 and the high tooth 3. The gap 5 is provided to afford an interval during the rotation of the cutting tool after one piece of work is completed, so as to permit of the removal of the one and the placing in position of the other.

In Figure 2 the cutting tool is the same as in Figure 1 except that the teeth $2^b$ of special shape are provided round part of the perimeter of the tool, so that a specially shaped cut can be made when completing the cut. Naturally the pitch and shape of the teeth are matters dependent solely on the work to be done. In this regard however it may be mentioned that numerous classes of work can be advantageously done with these cutting tools.

Figure 3:
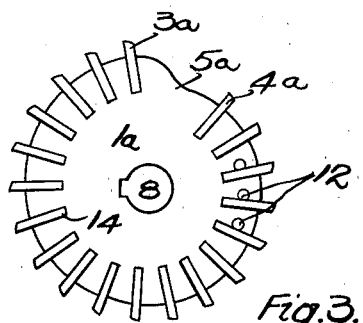
Figure 3 is a cutter wherein inserted teeth are arranged in an eccentric disc in the form of an eccentric spiral.

In Figure 3 inserted teeth $2^a$ are mounted in the eccentric disc $1^a$, the eccentricity of which should conform to the eccentric arrangement of the inserted teeth. The latter may be held in place in the slots 14 by pins 12 or in any other known manner. The inserted teeth $2^a$ may also be of any desired cross section instead of straight as shown. The gap $5^a$ is formed round the perimeter of the disc $1^a$ between the high tooth $3^a$ and the low tooth $4^a$.

In the cutting tools shown in Figures 1, 2 and 3 there is only one cutting range round the perimeter of the tool; this however does not limit the number of pieces of work that can be operated on simultaneously, in so much that as many pieces of work may be placed round the cutting tool as the perimeter of the latter permits.

Figure 4:
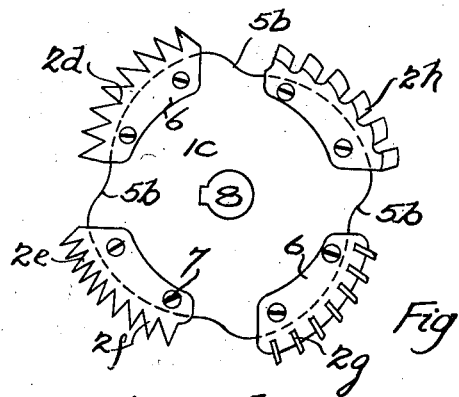
Figure 4 shows a compound cutting tool whereon a plurality of sectors having eccentric spiral teeth are attached. Different teeth arrangement is shown on each sector for the purpose of illustrating the range of work to which the invention may be applied.

Figure 4 shows a compound cutting tool having a plurality of cutting sectors 6, with gaps $5^b$ between each. The sectors are secured to the disc $1^c$ as by set screws 7.

Teeth of varying forms $2^d$, $2^e$, $2^f$, $2^g$, and $2^h$ are shown in the various sectors to suggest some of the different forms of work to which this cutting tool can be applied. But it is of course understood that when in operation the sectors must all be supplied with the same teeth.

In the case of compound cutting tools such as shown in Figure 4 the depth of the cut depends on the difference in eccentricity between the first and last tooth on the sector, and it will be noted that the first tooth of each sector is the same distance from the centre of the disc as also are all the last teeth.

Figure 5:
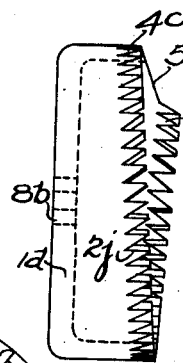
Figure 5 is a side elevation of a cutting tool having helical spiral teeth.
Figure 6:
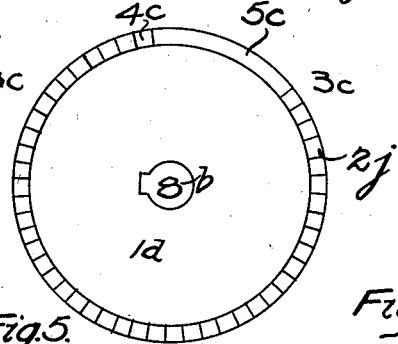
Figure 6 is a front view of Figure 5.
Figure 7:
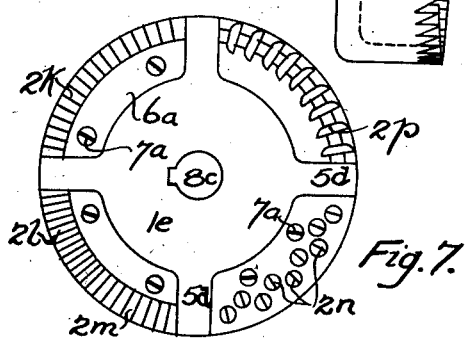
Figure 7 shows a compound cutting tool having a plurality of sectors with helical spiral teeth, varying shapes of teeth being shown on each sector for the purpose of showing the various ways the invention may be applied.

Figures 5, 6, and 7 represent a similar arrangement to that shown in the previous figures, except that the teeth are arranged in the form of a helical spiral more or less in line with the axis of the cutting tool.

In Figures 5 and 6, $1^d$ designates a disc and the teeth $2^j$ are integral therewith. $8^b$ represents the bore of the disc, $5^c$ is the gap, and $3^c$ and $4^c$ the high and low teeth respectively.

Figure 7 is a compound cutting tool with helical spiral teeth of different forms shown on each of the sectors $6^a$, which latter are mounted on the disc $1^e$ by means of set screws $7^a$.

The teeth $2^k$, $2^m$, $2^n$, and $2^p$ are merely to show to some extent what a variety of teeth can be supplied, but I do not in any way limit myself to the shapes and types of teeth shown.

$8^c$ designates the bore of the disc $1^e$. The gaps $5^d$ are provided between each cuttting range so that the height of each low tooth and each high tooth shall be the same, and so that exactly the same work shall be done by each cutting range. Moreover the purpose of the gap $5^c$ is identical with the purpose of the gaps in the eccentric spiral cutting tools.

The size of the cutting tools depends upon the number of cutting ranges to be supplied, the size and shape of the cut, and the nature and condition of the material to be worked on. And while simple cutting tools hereinbefore described have only one cutting range and one gap, two or more cutting ranges, with gaps between, can be provided on simple cutting tools when desired.

Moreover with certain shapes of cutting tools an action approximately that of a broach is obtained, the difference being that with this cutting tool the action is radial whereas with a broach it is parallel. This fact considerably enlarges the scope of the tool.

From the foregoing it will be clearly seen that I have devised a simple and economical form of cutting tool by which the troubles inherent to milling cutters can be obviated, and by which the same operation can be completed on a large number of pieces of work simultaneously without moving the axis of the cutting tool or the work.

Having thus described my invention what I desire to secure by Letters Patent is:—

1. A cutting tool comprising a central portion having a hole therethrough and adapted to be rotatably mounted, outer cutting ranges, each range having spirally arranged teeth each tooth in advance of the last, the teeth on each range being adapted to make the same cut so that a plurality of similar cutting operations may be performed during each rotation of the cutting tool, and a gap between each range.

2. A cutting tool as described in claim 1 wherein the teeth are removably secured to the cutting tool.

3. A cutting tool as described in claim 1 wherein the teeth are on sectors spirally mounted on the cutting tool.

4. A cutting tool as described in claim 1 wherein the teeth are on sectors secured to the cutting tool.

5. A cutting tool as described in claim 1 wherein the teeth are removably secured to sectors fastened to the cutting tool.

RICARDO A. RASZL.